(12) United States Patent
Ibarra et al.

(10) Patent No.: US 8,914,780 B2
(45) Date of Patent: Dec. 16, 2014

(54) INCREMENTAL GENERATION OF MANAGED ASSEMBLIES

(75) Inventors: Gustavo Adolfo Plancarte Ibarra, Woodinville, WA (US); Peter Villadsen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 955 days.

(21) Appl. No.: 13/040,264

(22) Filed: Mar. 4, 2011

(65) Prior Publication Data

US 2012/0227034 A1    Sep. 6, 2012

(51) Int. Cl.
*G06F 9/45* (2006.01)
*G06F 9/44* (2006.01)
*G06F 9/455* (2006.01)

(52) U.S. Cl.
CPC .............. *G06F 8/71* (2013.01); *G06F 9/45516* (2013.01)
USPC .......................................................... 717/145

(58) Field of Classification Search
CPC .............. G06F 8/37; G06F 8/41; G06F 8/443
USPC .......................................................... 717/145
See application file for complete search history.

(56) References Cited

U.S. PATENT DOCUMENTS

| 5,481,722 | A | 1/1996 | Skinner |
| 5,774,726 | A | 6/1998 | Ahmed |
| 7,596,782 | B2 | 9/2009 | Ebbo et al. |
| 2004/0194072 | A1* | 9/2004 | Venter ........................... 717/140 |
| 2005/0114771 | A1* | 5/2005 | Piehler et al. ................. 715/536 |
| 2007/0039010 | A1* | 2/2007 | Gadre ........................... 719/328 |
| 2010/0037211 | A1 | 2/2010 | Zakonov et al. |
| 2010/0083238 | A1* | 4/2010 | Barnett et al. ................. 717/136 |
| 2010/0088669 | A1* | 4/2010 | Cwalina et al. ............... 717/106 |
| 2010/0138817 | A1* | 6/2010 | Dubinsky et al. ............. 717/148 |

OTHER PUBLICATIONS

Foundations of C++/CLI: The Visual C++ Language for .NET 3.5, Gordon Hogenson, 2008.*
Creating CLARA—The Cross-Language Reusable Aspectlanguage, Brian G. Jørgensen, Jun. 6, 2007.*

(Continued)

*Primary Examiner* — Li B Zhen
*Assistant Examiner* — Arshia S Kia
(74) *Attorney, Agent, or Firm* — Damon Rieth; Jim Ross; Micky Minhas (57) ABSTRACT

Concepts and technologies are described herein for incremental generation of managed assemblies. In accordance with some of the concepts and technologies disclosed herein, a compiler incrementally generates a managed assembly thereby facilitating a rapid application development environment in which changes to the assembly require recompilation of only a changed portion of the assembly instead of recompilation of the entire assembly.

15 Claims, 8 Drawing Sheets

(56) References Cited

OTHER PUBLICATIONS

"Managed Incremental Build", Retrieved at<<http://blogs.msdn.com/b/vcblog/archive/2007/03/02/managed-incremental-build.aspx>>, Mar. 2, 2007, pp. 3.

"How to Auto-Increment Assembly Version Using a Custom MSBuild Task", Retrieved at << http://weblogs.asp.net/bradleyb/archive/2005/12/02/432150.aspx>>, Dec. 2, 2005, pp. 15.

Karmanov, Alexander, "Deploying Database Developments", Retrieved at<< http://www.simple-talk.com/sql/database-administration/deploying-database-developments/#_Toc201468817>>, Jun. 17, 2008, pp. 23.

Smacchia, Patrick, "Practical .NET2 and C#2: An Introduction to MSBuild", Retrieved at<<http://www.codeproject.com/KB/books/msbuild.aspx>>, Feb. 7, 2006, pp. 13.

An Introduction to the Common Compiler Infrastructure, Retrieved Feb. 25, 2011, at http://ccimetadata.codeplex.com/wikipage?title>>, p. 1.

Netmodule vs. Assembly, Retrieved at<<http://blogs.msdn.com/b/junfeng/archive/2005/02/12/371683.aspx>>, Feb. 12, 2005, pp. 2.

Cecil, Retrieved Feb. 25, 2011, at<<http://www.mono-project.com/Cecil>>, pp. 4.

\* cited by examiner

INCREMENTAL GENERATION OF MANAGED ASSEMBLIES

BACKGROUND

The .NET framework is a common language infrastructure (CLI) framework that provides the compile time and run-time functions to build and run applications written in languages that conform to the common language specification (CLS). The .NET framework consists of two core components, a common language runtime (CLR) and a framework class library (FCL). The CLR is the execution environment of the .NET framework. The CLR provides a language-independent layer of abstraction between CLS-compliant programming languages and an operating system (OS) with a primary function of just-in-time (JIT) compilation of common intermediate language (CIL) code generated by a CLS-compliant language compiler into native code to the OS. During execution of an application, the CLR is responsible for memory management, thread execution, garbage collection, exception handling, common type system definition, code safety verification, and other system services. The FCL is a library of language-independent and type-safe reusable classes, interfaces, and value types that expedite and optimize the development process and provide access to system functionality.

Source code written in a CLS-compliant programming language is compiled into CIL code as a collection of types and resources called an assembly. Each assembly contains an assembly manifest and portable executable (PE) code. The assemblies can include one or more program files. The program files may be executable files stored in a PE file format as either process assemblies (.exe) or library assemblies (.dll). The PE code of an assembly may be stored in one or more code modules (e.g., net modules). In this case, the net module(s) are associated with an assembly manifest in an assembly to be executed by a JIT compiler. The assembly manifest contains a set of metadata with information that describes the assembly and its contents and may itself be stored in a PE file.

.NET assemblies are an immutable logical unit for managed languages such as C#, VB.NET, and C++/CLI. If there is a change to source code, the entire source code needs to be recompiled to recreate the assembly. Recompilation is suitable when an assembly is small, or when build time is not an issue. However, for scenarios in which rapid application development is important and small changes are required to be quickly compiled (e.g., for testing purposes), the inability to incrementally generate assemblies results in reduced developer productivity.

It is with respect to these and other considerations that the disclosure made herein is presented.

SUMMARY

Concepts and technologies are described herein for incremental generation of managed assemblies. In accordance with the concepts and technologies disclosed herein, a compiler incrementally generates a managed assembly thereby facilitating a rapid application development environment in which changes to the assembly require recompilation of only the changed portion of the assembly instead of recompilation of the entire assembly.

According to one aspect, a compiler generates an assembly including an assembly manifest and a plurality of code modules, each of which contains common intermediate language (CIL) code. If a type change occurs within the CIL code of any of the plurality of code modules, the compiler regenerates the code module in which the type change occurred to form a regenerated code module. The regenerated code module includes regenerated CIL code that replaces at least a portion of the CIL code of the code module. The compiler generates a temporary assembly including the regenerated code module. The compiler replaces the code module of the assembly with the regenerated code module of the temporary assembly and regenerates the assembly manifest.

According to another aspect, the compiler generates a master assembly comprising a plurality of types. If the compiled code introduces one or more changes to an existing type, the compiler generates a new assembly including a changed type reflecting the type change to the type. The compiler then replaces the type in the master assembly with the changed type from the new assembly.

According to yet another aspect, the compiler compiles source code written in a managed programming language into CIL code and metadata thereby generating an assembly. The assembly includes a dynamic-linked library (.dll) file containing an assembly manifest including metadata about the assembly and a plurality of code module files, each of which includes a portion of the CIL code. The plurality of code module files may be stored, for example, in a .netmodule file format. The assembly is represented in a first location of a file system.

If a type change occurs within one or more of the .netmodule files, the compiler regenerates the .netmodule file within which the type change was detected thereby forming a regenerated .netmodule file. The compiler generates a temporary assembly including the regenerated .netmodule file. The temporary assembly is represented in a second location of the file system. The compiler then copies the regenerated .netmodule file from the second location of the file system and replaces the .netmodule file in the first location of the file system with the regenerated .netmodule file copied from the second location of the file system. The compiler regenerates the .dll file containing the assembly manifest.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for incremental generation of managed assemblies. According to one aspect of the concepts and technologies described herein, a compiler generates an assembly including an assembly manifest and a plurality of code modules. If a type change occurs within the code of any of the plurality of code modules, the compiler regenerates the code module in which the type change occurred to form a regenerated code module. The regenerated code module includes regenerated CIL code that replaces at least a portion of the CIL code of the code module. The compiler generates a temporary assembly including the regenerated code module. The compiler then replaces the code module of the assembly with the regenerated code module of the temporary assembly and regenerates the assembly manifest.

According to another aspect of the concepts and technologies described herein, a compiler generates a master assembly comprising a plurality of types. If a type change occurs to a type, the compiler generates a new assembly including a changed type reflecting the type change to the type. The compiler then replaces the type in the master assembly with the changed type from the new assembly.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for incremental generation of managed assemblies will be presented.

Figure 1:
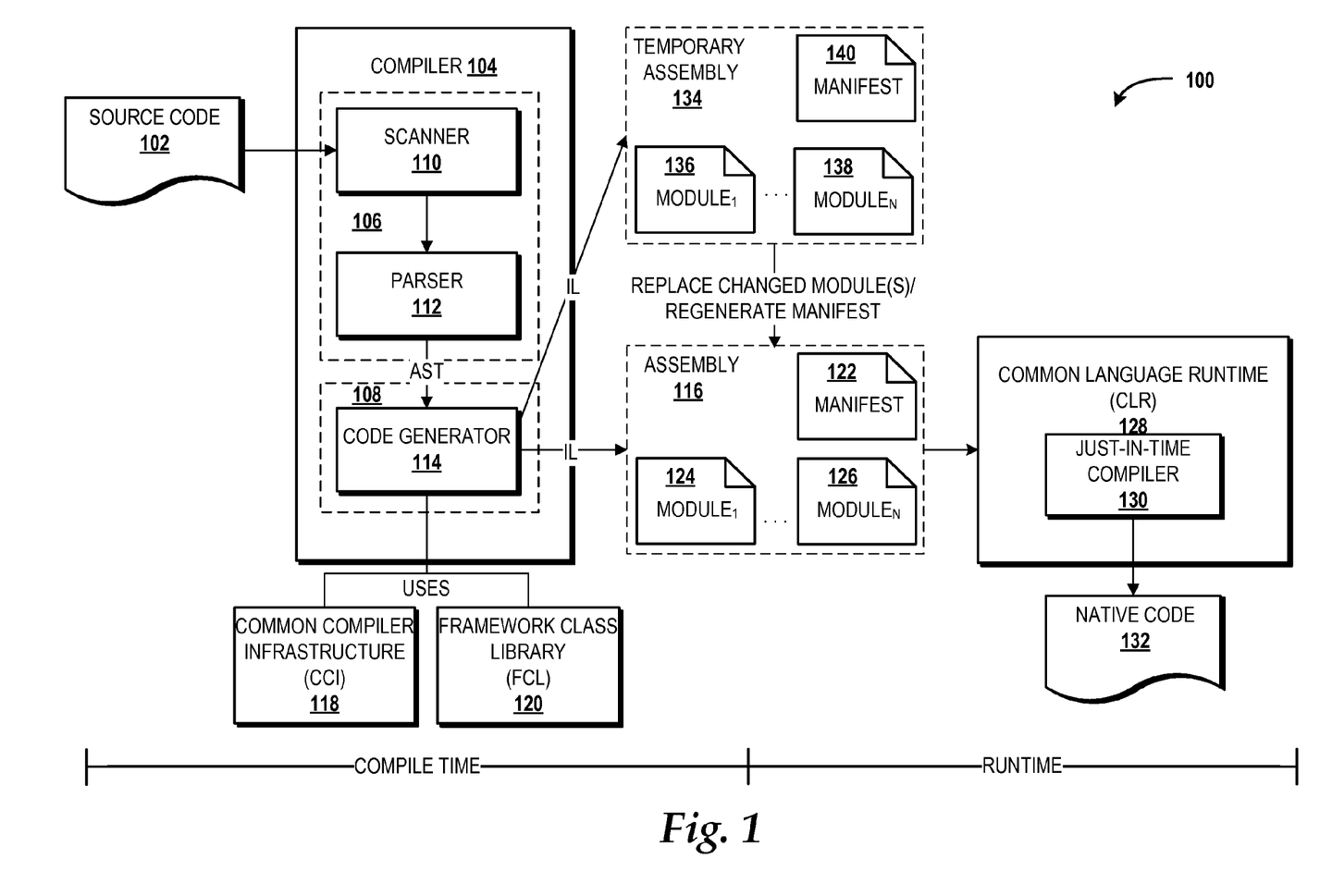
FIG. 1 is a system diagram illustrating an exemplary operating environment for implementing various embodiments presented herein.

Referring now to FIG. 1, aspects of one operating environment 100 for various embodiments presented herein will be described. The operating environment 100 of FIG. 1 is illustrated and described in context of a software development framework, such as MICROSOFT .NET framework from Microsoft Corporation in Redmond, Wash., that provides compile time and runtime operations to build and execute software applications written in languages that conform to the common language specification (CLS). Although various aspects are disclosed in this particular context, those skilled in the art will appreciate the applicability of many of the disclosed aspects to other software development frameworks that function in a manner similar to the .NET framework or rely on concepts and/or technologies that are similar to those embodied by the .NET framework. Moreover, the various aspects disclosed herein are applicable to any compiler that generates intermediate language (IL) code including, but not limited to, common intermediate language (CIL) code, that is executable by a language-independent runtime environment.

The operating environment 100 shown in FIG. 1 illustrates software components of a computing system for performing compile time functions to facilitate incremental generation of managed assemblies and runtime operations to execute the assemblies. The illustrated operating environment 100 includes source code 102 written in one or more source programming languages including, but not limited to, VB.NET, C#, C++/CLI, and X++. The source code 102 is provided as input to one or more compilers 104 (hereinafter, "compiler"). The compiler 104 is configured to read a software program written in the source code 102 and translate it into CIL code as a collection of files and metadata called an assembly for execution via a language-independent runtime environment provided by the .NET framework, as described in greater detail below.

The compiler 104 is logically divided into a front end 106 and a back end 108. The front end 106 includes a scanner 110 and a parser 112. The back end 108 includes a code generator 114. The scanner 110 receives the source code 102 as a character stream which it breaks down into groups of characters called tokens that are consumable by the parser 112. The parser 112 analyzes the tokens for proper syntax and builds a data structure, such as an abstract syntax tree (AST) or other abstract syntactic structure of the source code 102. The code generator 114 receives the AST from the parser 112 and converts and converts it into CIL code as an executable assembly 116. It should be understood that the compiler 104 may take multiple passes over the data structure before generating the CIL code. The code generator 114 uses libraries 118, 120 provided by the Common Compiler Infrastructure (CCI) framework and the .NET framework, respectively, to generate and modify assembly code and metadata to facilitate incremental generation of the assembly 116 if changes occur to code within the assembly 116. Other libraries, such as the open source library CECIL, from the MONO PROJECT sponsored by NOVELL CORPORATION, could be utilized as an alternative or in addition to the CCI framework libraries. The CCI 118 and the .NET framework class library (FCL) 120 are described in greater detail below with reference to FIG. 3.

The assembly 116 contains an assembly manifest 122 and a plurality of code modules (module$_1$ ... module$_n$, where n is an integer) 124, 126. The assembly manifest 122 includes metadata about the assembly 116 including a description of the relationships and dependencies among the code modules 124, 126. In some embodiments, the assembly manifest 122 is stored in a portable executable (PE) file format as a library assembly in a dynamic-link library (.dll) file. The code modules 124, 126 include CIL code compiled from the source code 102. The code module 124, 126 are stored in individual files which, in some embodiments, are in a .netmodule file format.

The assembly 116 is executable by a common language runtime (CLR) 128 of the .NET framework. The CLR 128 functions like a virtual machine using a just-in-time (JIT) compiler 130 to convert the CIL code of the assembly 116 into native code 132 useable by the particular machine upon which the assembly 116 is executing. During execution of the assembly 116, the CLR 128 is responsible for memory management, thread execution, garbage collection, exception handling, common type system definition, code safety verification, and other system services.

If during development of the assembly 116, code within one or more of the code modules 124, 126 is changed (e.g., by a developer), the code generator 114 can generate a temporary assembly 134 with new code modules (module$_1$ ... module$_n$, where n is an integer) 136, 138 using the same filenames as the old code modules 124, 126 from the assembly 116. The new code modules 136, 138 include new CIL code replacing the code that changed within the code modules 124, 126. In some embodiments, the changed code is associated with a particular type used in the assembly 116. As used herein, a "type" broadly refers to a set of values and the allowable operations on those values.

In the illustrated embodiment, the temporary assembly 134 also includes a temporary assembly manifest 138 that is regenerated by the compiler 104 using the CCI 118. In various embodiments, the compiler 104 also generates a debugging file, such as a program database (PDB) file, that includes debugging and project state information collectively for all code modules 124, 126, or individually for each code module 124, 126 within the assembly 116.

Figure 2:
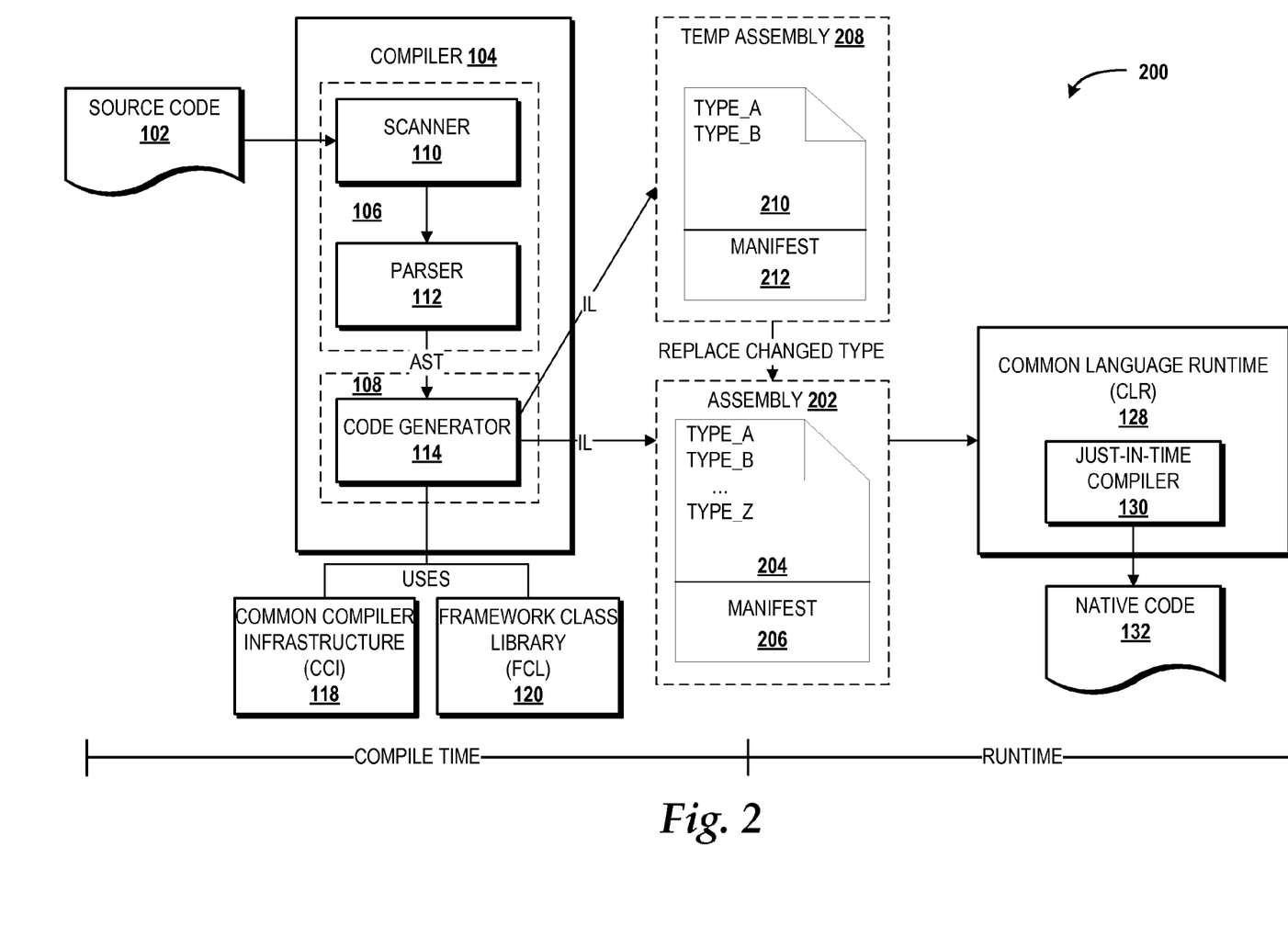
FIG. 2 is another system diagram illustrating an exemplary operating environment for implementing various embodiments presented herein.

Turning now to FIG. 2, aspects of another operating environment 200 for various embodiments presented herein will be described. The operating environment 200 includes many of the same software components illustrated and described above with reference to the operating environment 100 of FIG. 1. In particular, the operating environment 200 includes the compiler 104, the associated front end 106 and back end 108 components including the scanner 110, the parser 112, and the code generator 114, the CCI 118, the FCL 120, the CLR 128, and the JIT compiler 130.

In the operating environment 200, the code generator 114 receives the AST from the parser 112 and converts it into CIL code as the executable assembly 202. The code generator 114 uses the CCI 118 and the .NET FCL 120 to generate and modify assembly code and metadata to facilitate incremental generation of the assembly 202 if changes occur to code within the assembly 202.

The assembly 202 as illustrated includes a single PE file (e.g., a .dll file) containing all types 204 referenced in the assembly 202 and an assembly manifest 206. Although the illustrated embodiment references exemplary types, Type_A through Type_Z including up to twenty-six types, the types 204 may include any number of types. The assembly manifest 206 includes metadata about the assembly 202 including a description of the relationships and dependencies among the types 204. The assembly 202 is executable by the CLR 128. The CLR 128 uses the JIT compiler 130 to convert the CIL code of the assembly 202 into native code 132 useable by the particular machine upon which the assembly 202 is executing.

If during development of the assembly 202, a developer changes one or more of the types 204, the code generator 114 generates a temporary assembly 208 including only the changed types. In the illustrated embodiment, TYPE_A and TYPE_B have been changed in the assembly 202 and, accordingly, changed TYPE_A and changed TYPE_B, collectively changed types 210, are included in the temporary assembly 208. In some embodiments, one or more of the changed types 210 references one or more of the types 204 included in the assembly 202. For example, TYPE_A of the changed types 210 may reference TYPE_C of the types 204, and/or TYPE_B of the changed types 210 may reference TYPE_D of the types 204. In any case, the code generator 114 uses the CCI 116 to replace TYPE_A and TYPE_B of the types 204 with TYPE_A and TYPE_B of the changed types 210. In some embodiments, any debugging files (e.g., PDBs) may also be modified and replaced in accordance with the type change.

Figure 3:
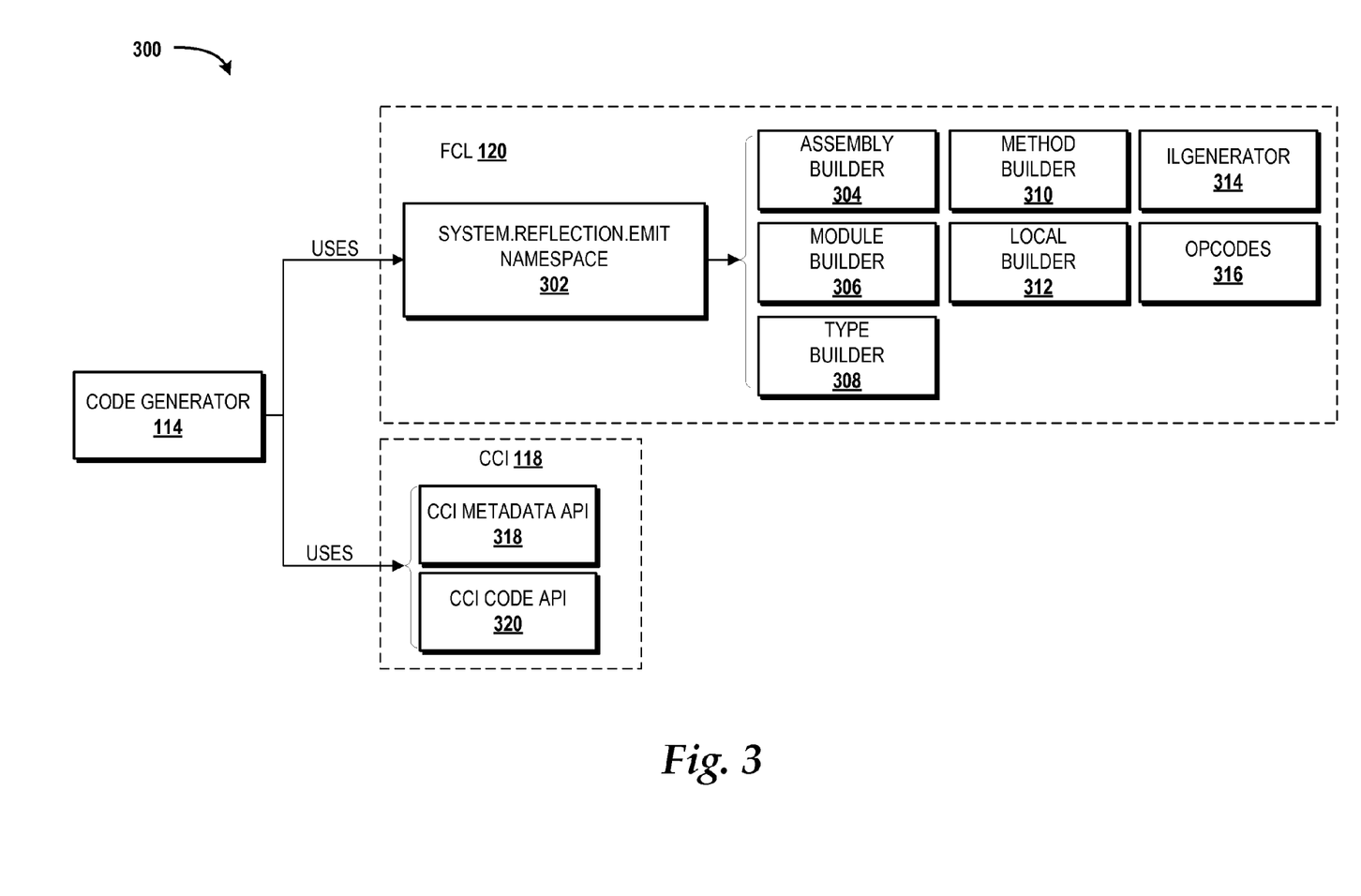
FIG. 3 is a data structure diagram that schematically illustrates a data structure of exemplary libraries and classes used by a code generator of a compiler to incrementally generate a managed assembly according to various embodiments presented herein.

Turning now to FIG. 3, aspects of a data structure 300 of exemplary libraries and classes used by the code generator 114 of the compiler 104 to incrementally generate a managed assembly for various embodiments presented herein will be described. As referenced above in the description of FIGS. 1 and 2, the code generator 114 uses the CCI 118 and the FCL 120 to generate and modify assembly code and metadata to facilitate incremental generation of an assembly if changes occur to code (e.g., changes to types) within that assembly.

The FCL 120 is a library of classes, interfaces, and value types that provides access to system functionality and is designed as the foundational library upon which .NET framework applications, components, and controls are built. The FCL 120 provides a plurality of namespaces, each of which contains one or more classes, structures, interfaces, delegates, and/or enumerations. For the embodiments disclosed herein, the code generator 114 relies on at least one such namespace called the System.Reflection.Emit namespace 302 to emit metadata and CIL code of the assemblies 116, 134, 202, 208, and others, described herein.

The System.Reflection.Emit namespace 302 as illustrated includes an AssemblyBuilder class 304, a ModuleBuilder class 306, a TypeBuilder class 308, a MethodBuilder class 310, a LocalBuilder class 312, an ILGenerator class 314, and an OpCodes class 316. The AssemblyBuilder class 304 includes various members for defining and representing an assembly. The ModuleBuilder class 306 includes various members for defining and representing modules within an assembly. The TypeBuilder class 308 includes various members for defining and generating new instances of classes during runtime. The MethodBuilder class 310 includes various members for defining and representing a method in a dynamic class. The LocalBuilder class 312 includes various members for representing a local variable within a method. The ILGenerator class 314 includes various members for generating CIL code. The OpCodes class 316 provides field representations of the CIL instructions for emission by the ILGenerator class 318 members. Although only the above classes are illustrated and described, the System.Reflection.Emit namespace 302 includes other classes that may or may not be relied upon by the compiler 104 to generate and/or modify the assemblies 116, 134, 202, 208, and others, described herein.

The CCI 118 includes libraries and application programming interfaces (APIs) that can be used by the compiler 104 to perform incremental generation of assemblies. The CCI 118 supports interaction with PE files, such as assemblies and discrete code modules (e.g., the code modules 124, 126 of FIG. 1), and debugging files, such as PDBs. For the embodiments described herein, the CCI 118 is used as a rewriting tool to replace existing code within an assembly with modified code from a temporary assembly in accordance with the various embodiments presented herein.

The CCI 118 as illustrated includes a CCI metadata API 318 and a CCI code API 320. The compiler 104 can use the CCI metadata API 318 to modify metadata associated with an assembly, such as metadata included in an assembly manifest. The compiler 104 can use the CCI metadata API 318 and/or the CCI code API 320 to modify CIL code of an assembly. In various embodiments, the compiler 104 also uses the CCI 118 in combination with the FCL 120 (particularly the ILGenerator class 314) to generate CIL code of an assembly.

Figure 4:
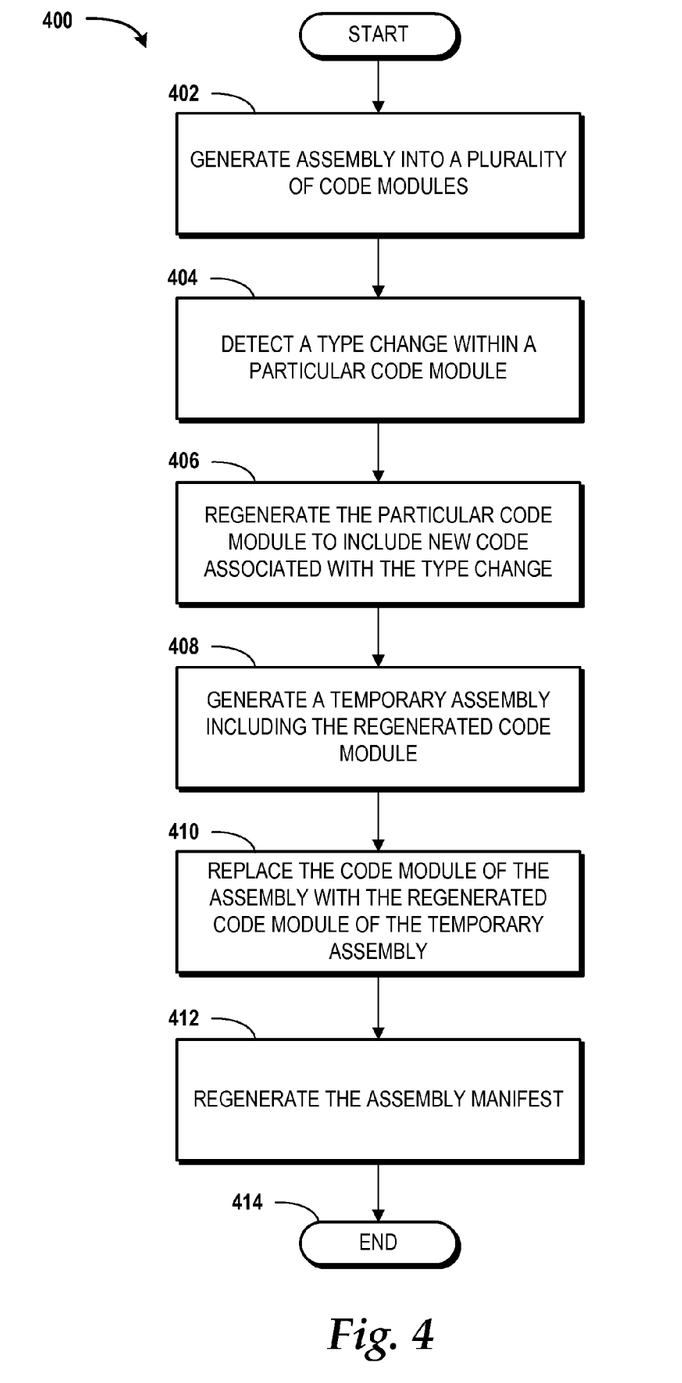
FIG. 4 is a flow diagram showing aspects of a method for incremental generation of a managed assembly, according to an exemplary embodiment.

Turning now to FIG. 4, aspects of a method 400 for incrementally generating an assembly will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the compiler 104 and, in some instances, more particularly the code generator 114. It should be understood that these embodiments are exemplary, and should not be viewed as being limiting in any way. The method 400 is now described with reference to FIG. 4 and to FIG. 5 for further ease of description and illustration.

Figure 5:
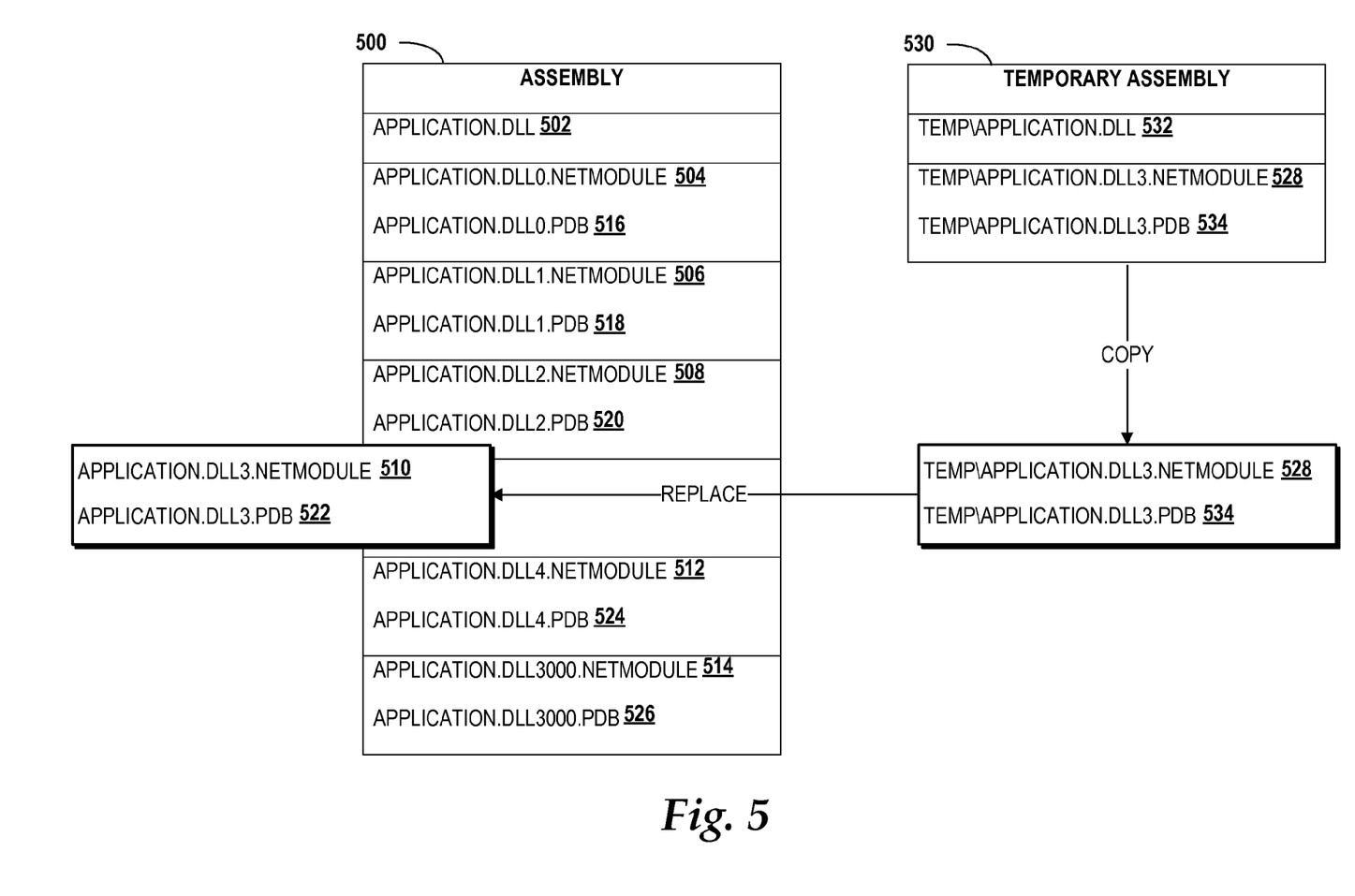
FIG. 5 is a data structure diagram that schematically illustrates a data structure of assemblies generated utilizing the method illustrated in FIG. 4, according to an exemplary embodiment.

The method 400 begins at operation 402, wherein the compiler 104 generates an assembly 500 including an assembly manifest 502 and a plurality of code modules 504, 506, 508, 510, 512, 514. The assembly manifest 502 as illustrated is a single .dll file including metadata that describes the assembly 500 and the plurality of code modules 504, 506, 508, 510, 512, 514 included in the assembly 500. The plurality of code modules 504, 506, 508, 510, 512, 514 each include CIL code generated by the code generator 114. In the illustrated embodiment, this CIL code is stored in .netmodule files within the assembly, although other file types are contemplated. The plurality of code modules 504, 506, 508, 510, 512, 514 may each be associated with a debugging file, illustrated as PDB files 516, 518, 520, 522, 524, 526, respectively.

From operation 402, the method 400 proceeds to operation 404, wherein the compiler 104 detects a type change within a particular code module 510 of the plurality of code modules 504, 506, 508, 510, 512, 514, 516. The type change may be detected, for example, when a developer recompiles code after making a modification to the particular code module 510. Although operation 402 describes the detection of a type change within a body of code, it is contemplated that the detected change may be any change to code that would traditionally require recompilation of the entire assembly 500.

From operation 404, the method 400 proceeds to operation 406, wherein the compiler 104 regenerates the particular code module 510 to form a regenerated code module 528 including new code reflecting the type change. In some embodiments, the particular code module 510 and the regenerated code module 528 are saved in different locations within a file system using the same filename. For example, in the illustrated embodiment, the particular code module 510 is stored in a first location of the file system under the exemplary filename, "Application.dll3.netmodule." Likewise, the regenerated code module 528 is stored in a second location of the file system under the same filename. The second location is illustrated as being within a "Temp\" directory within the file system. Alternative filename and directory naming conventions are contemplated.

From operation 406, the method 400 proceeds to operation 408, wherein the compiler 104 generates a temporary assembly 530 including the regenerated code module 528. From operation 408, the method 400 proceeds to operation 410, wherein the compiler 104 replaces the particular code module 510 of the assembly 500 with the regenerated code module 528 from the temporary assembly 530. For example, the compiler 104 may copy the regenerated code module 528 from the temporary assembly 530 and replace the particular code module 510 of the assembly 500, as shown in the illustrated embodiment.

From operation 410, the method 400 proceeds to operation 412, wherein the compiler 104 regenerates the assembly manifest 502. In one embodiment, the compiler 104 replaces the assembly manifest 502 with a regenerated assembly manifest 532 of the temporary assembly 530. In this embodiment, the regenerated assembly manifest 532 may be generated including metadata associated with all code modules of the assembly 500 except the particular code module 510 and metadata associated with the regenerated code module 528. In another embodiment, the compiler 104 regenerates the assembly manifest 502 during recompilation when the particular code module 510 is replaced with the regenerated code module 528. In this embodiment, the regenerated assembly manifest 532 may include metadata only associated with the regenerated code module 528 which is then used in part to regenerate the assembly manifest 502. Alternatively, dummy metadata may be used as a placeholder for the temporary assembly 530. From operation 412, the method 400 proceeds to operation 414. The method 400 ends at operation 414.

Figure 6:
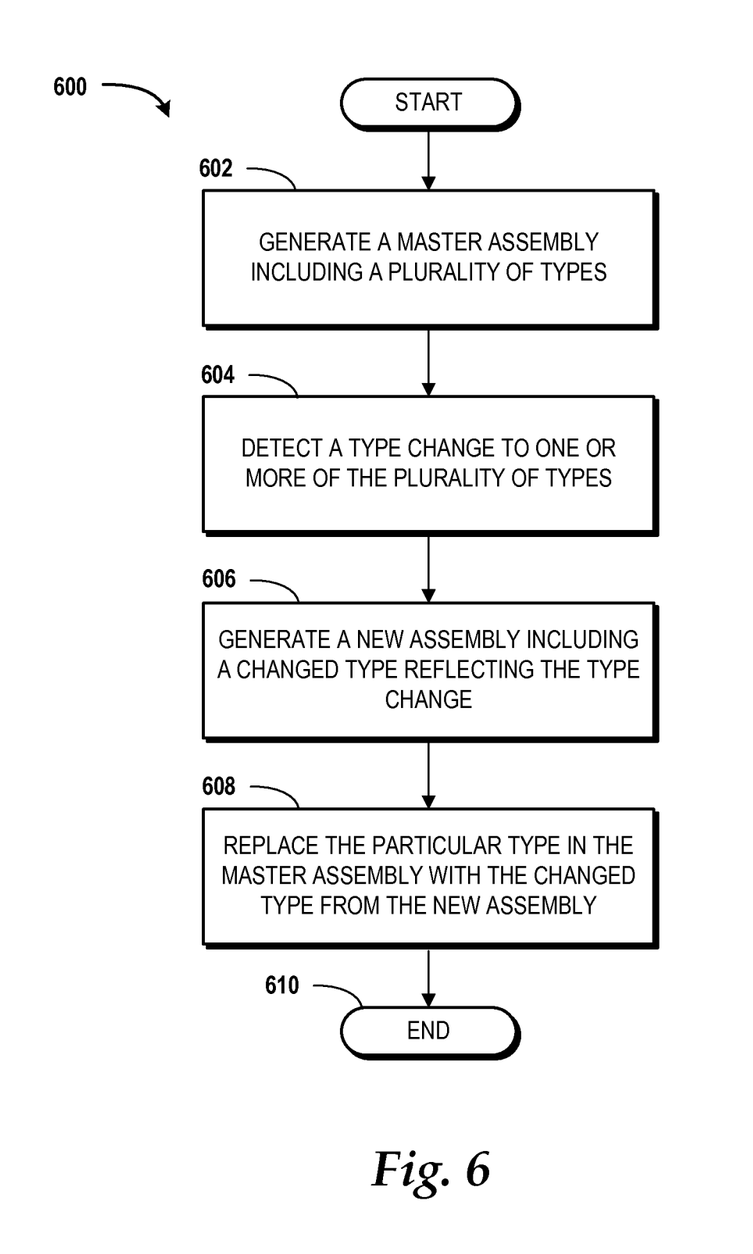
FIG. 6 is a flow diagram showing aspects of another method for incremental generation of a managed assembly, according to an exemplary embodiment.
Figure 7:
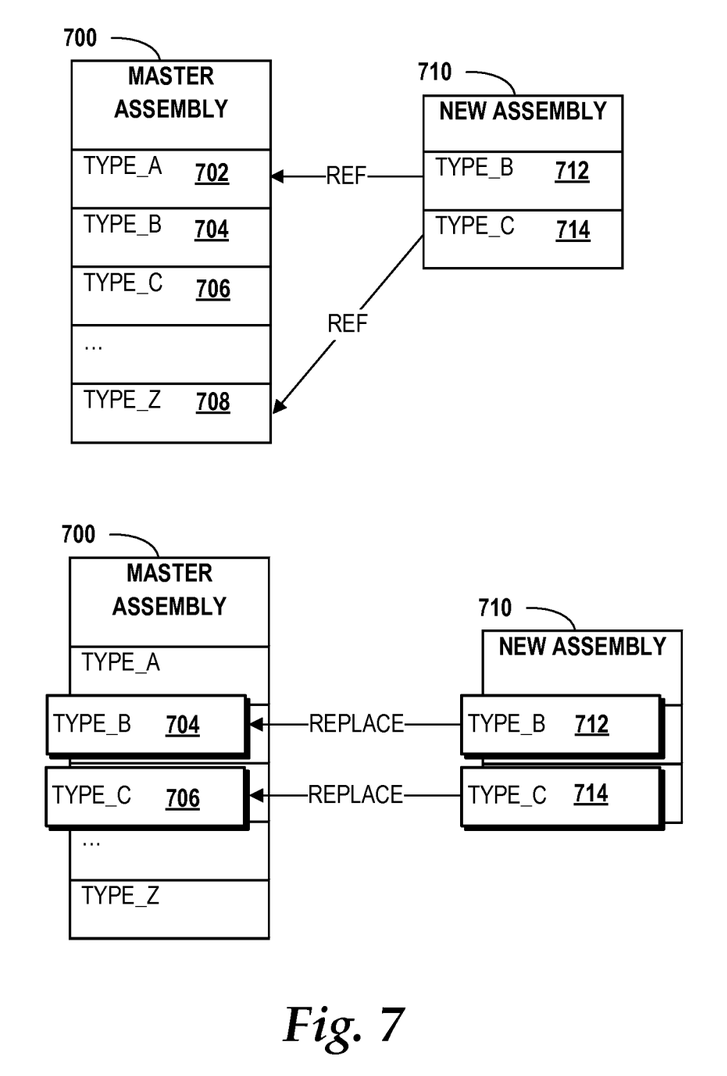
FIG. 7 is a data structure diagram that schematically illustrates a data structure of assemblies generated utilizing the method illustrated in FIG. 6, according to an exemplary embodiment.

Turning now to FIGS. 6 and 7, aspects of a method 600 for incrementally generating an assembly will be described in detail. The method 600 begins at operation 602, wherein the compiler 104 generates a master assembly 700 including a plurality of types 702, 704, 706, 708. From operation 602, the method 600 proceeds to operation 604, wherein the compiler 104 detects a type change to one or more of the plurality of types 702, 704, 706, 708. The type change may be detected, for example, when a developer recompiles code after making a modification to one or more of the plurality of types 702, 704, 706, 708. Although the illustrated embodiment references exemplary types, TYPE_A through TYPE_C and TYPE_Z, any number of types may be included in the master assembly 700.

From operation 604, the method 600 proceeds to operation 606, wherein the compiler 104 generates a new assembly 710 including changed types, TYPE_B 712 and TYPE_C 714. Each changed type may reference one or more types from the master assembly 700 or include no references to any types from the master assembly 700 based upon the dependencies between changed types and original types. In the illustrated embodiment, TYPE_B 712 references TYPE_A 702 from the master assembly 700 and TYPE_B 714 references TYPE_Z 708 from the master assembly 700.

From operation 606, the method 600 proceeds to operation 608, wherein the compiler 104 replaces TYPE_B 704 and TYPE_C 706_in the master assembly 700 with changed types TYPE_B 712 and TYPE_C 714 from the new assembly 710. From operation 608, the method 600 proceeds to operation 610. The method 600 ends at operation 610.

Figure 8:
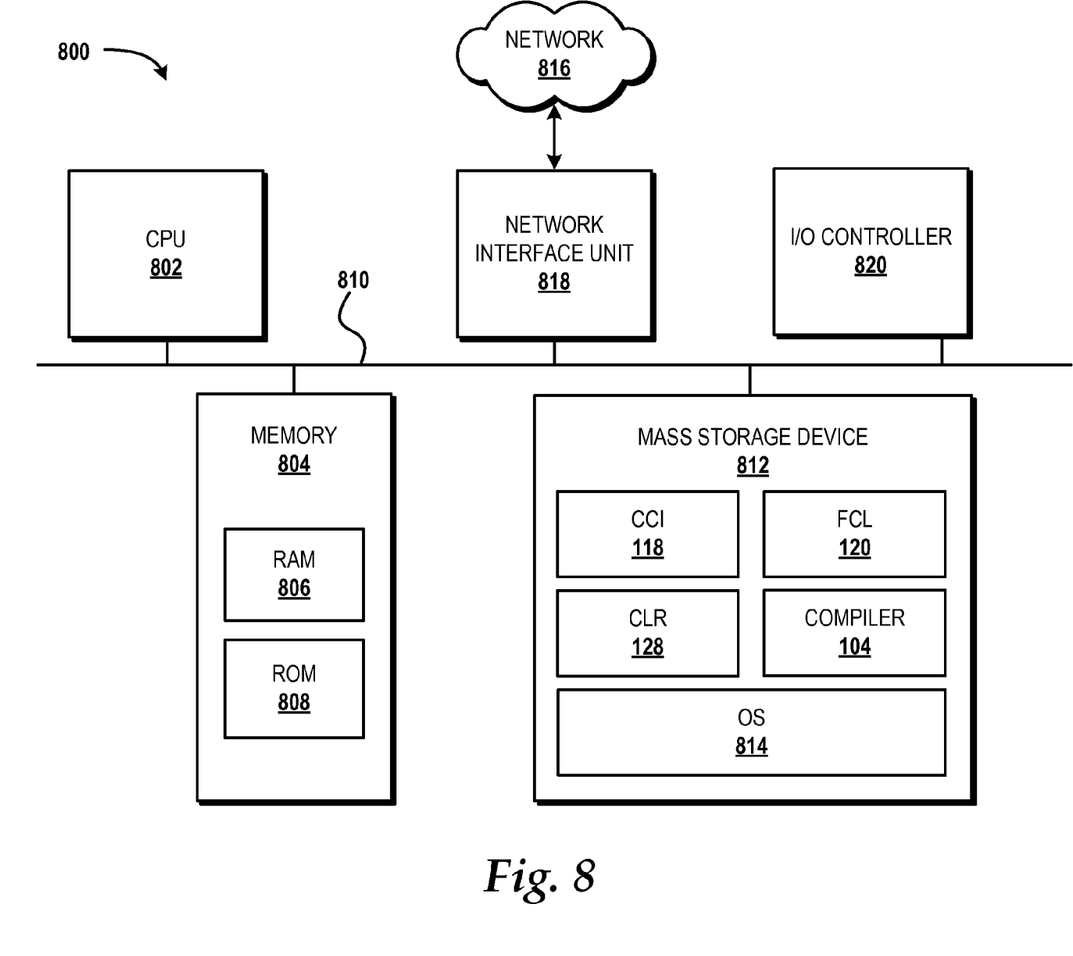
FIG. 8 is a computer architecture diagram illustrating an exemplary computer hardware and software architecture for a computing system capable of implementing aspects of the embodiments presented herein.

FIG. 8 illustrates an exemplary computer architecture 800 for a device capable of executing the software components described herein for incremental generation of managed assemblies. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, the CCI 118, the FCL 120, the CLR 128, and the compiler 104.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium" and variations thereof, does not include waves, signals, and/or other transitory and/or intangible communication media, per se.

According to various embodiments, the computer architecture 800 may operate in a networked environment using logical connections to remote computers through a network such as the network 816. The computer architecture 800 may connect to the network 816 through a network interface unit 818 connected to the bus 810. It should be appreciated that the network interface unit 816 also may be utilized to connect to other types of networks and remote computer systems. The computer architecture 800 also may include an input/output controller 820 for receiving and processing input from a number of other devices, including a keyboard, mouse, electronic stylus, or other input device (not shown in FIG. 8). Similarly, the input/output controller 820 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Based on the foregoing, it should be appreciated that technologies for incremental generation of managed assemblies have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for incrementally generating managed assemblies, the computer-implemented method comprising performing computer-implemented operations for:
    detecting a type change in common intermediate language (CIL) code of a code module within an assembly, the assembly comprising an assembly manifest contained within a dynamic-link library (.dll) file and a plurality of code modules stored in a plurality of .netmodule files within the assembly;
    in response to detecting the type change, regenerating the code module to form a regenerated code module comprising regenerated CIL code that replaces at least a portion of the CIL code of the code module changed by the type change;
    generating a temporary assembly comprising the regenerated code module;
    replacing the code module of the assembly with the regenerated code module of the temporary assembly; and
    regenerating the assembly manifest to form a regenerated assembly manifest utilizing functions provided by a Common Compiler Infrastructure (CCI) framework.

2. The computer-implemented method of claim 1, wherein the assembly manifest and the regenerated assembly manifest contain metadata describing contents of the assembly and the temporary assembly, respectively.

3. The computer-implemented method of claim 1, wherein the code module and the regenerated code module are associated with a same filename.

4. The computer-implemented method of claim 3, wherein the code module is stored in a first location of a file system and the regenerated code module is stored in a second location of the file system.

5. The computer-implemented method of claim 1, wherein the code module is associated with debugging data stored in a debugging file, and the method further comprising, in response to detecting the type change, regenerating the debugging file to form a regenerated debugging file, the regenerated debugging file comprising regenerated debugging data that reflects changes to the debugging data.

6. The computer-implemented method of claim 1, wherein each of the plurality of code modules is stored in a separate .netmodule file of the plurality of .netmodule files within the assembly.

7. The computer-implemented method of claim 1, wherein the plurality of code modules are compiled from source code written in at least one programming language.

8. The computer-implemented method of claim 1, wherein regenerating the code module comprises regenerating the code module referencing at least one of the plurality of code modules upon which the code module depends.

9. A computer-implemented method for incrementally generating managed assemblies, the computer-implemented method comprising performing computer-implemented operations for:
    generating a master assembly comprising a plurality of types, wherein the master assembly comprises a single dynamic-link library (.dll) file comprising common intermediate language (CIL) code and an assembly manifest;
    detecting a type change to a particular type of the plurality of types;
    generating a new assembly comprising a changed type reflecting the type change to the particular type; and
    replacing the particular type in the master assembly with the changed type from the new assembly utilizing functions provided by a Common Compiler Infrastructure (CCI) framework.

10. The computer-implemented method of claim 9, wherein the changed type references at least one other type of the plurality of types from the master assembly.

11. The computer-implemented method of claim 9, wherein generating the master assembly and the new assembly comprises generating the master assembly and the new assembly utilizing an IL code generator (ILGenerator) class within a System.Reflection.Emit namespace of a .NET Framework Class Library (FCL).

12. A computer storage medium having computer readable instructions stored thereupon that, when executed by a computer, cause the computer to:
    compile source code written in a managed programming language into common intermediate language (CIL) code and metadata thereby generating an assembly comprising
        a dynamic-linked library (.dll) file containing an assembly manifest comprising the metadata, and
        a plurality of .netmodule files comprising the CIL code;
    represent the assembly in a first location of a file system;

detect a type change within a .netmodule file of the plurality of .netmodule files;

in response to detecting the type change, regenerate the .netmodule file within which the type change was detected thereby forming a regenerated .netmodule file;

generate a temporary assembly comprising the regenerated .netmodule file;

represent the temporary assembly in a second location of the file system;

copy the regenerated .netmodule file from the second location of the file system;

replace the .netmodule file in the first location of the file system with the regenerated .netmodule file copied from the second location of the file system; and regenerate the .dll file containing the assembly manifest of the assembly to form a regenerated assembly manifest utilizing functions provided by a Common Compiler Infrastructure (CCI) framework.

13. The computer storage medium of claim 12, wherein generating the assembly and generating the temporary assembly comprise generating the assembly and generating the temporary assembly utilizing an intermediate language code generator (ILGenerator) class within a System.Reflection.Emit namespace of a .NET Framework Class Library (FCL).

14. The computer storage medium of claim 12, wherein regenerating the .netmodule file comprises regenerating the .netmodule file referencing at least one of the plurality of .netmodule files upon which the .netmodule file depends.

15. The computer storage medium of claim 12, further comprising instructions that, when executed by the computer, cause the computer to:

generate a plurality of debugging files, each of which is associated with one of the plurality of .netmodule files; and regenerate the debugging file of the plurality of debugging files that is associated with the .netmodule file.

* * * * *